US010892918B1

(12) United States Patent
Eachempatti et al.

(10) Patent No.: US 10,892,918 B1
(45) Date of Patent: Jan. 12, 2021

(54) SYSTEM AND METHOD FOR DECISION FEEDBACK EQUALIZERS

(71) Applicant: Xilinx, Inc., San Jose, CA (US)

(72) Inventors: Haritha Eachempatti, San Jose, CA (US); Hsung Jai Im, San Jose, CA (US)

(73) Assignee: Xilinx, Inc., San Jose, CA (US)

(*) Notice: Subject to any disclaimer, the term of this patent is extended or adjusted under 35 U.S.C. 154(b) by 0 days.

(21) Appl. No.: 16/523,966

(22) Filed: Jul. 26, 2019

(51) Int. Cl.
*H04L 25/03* (2006.01)

(52) U.S. Cl.
CPC ...... *H04L 25/03057* (2013.01); *H04L 2025/0349* (2013.01)

(58) Field of Classification Search
CPC .............. H04L 25/03057; H04L 2025/0349
USPC ................................................. 375/232, 233
See application file for complete search history.

(56) References Cited

U.S. PATENT DOCUMENTS

| 4,147,958 | A | 4/1979 | Ahearn et al. |
| 7,715,474 | B2 | 5/2010 | Park et al. |
| 2009/0060021 | A1* | 3/2009 | Bulzacchelli ..... H04L 25/03057 375/233 |
| 2019/0182079 | A1* | 6/2019 | Tajalli ............... H04L 25/03038 |

OTHER PUBLICATIONS

Bulzacchelli et al., "A 10-Gb/s 5-Tap DFE/4-Tap FFE Transceiver in 90-nm CMOS Technology" IEEE Journal of Solid-State Circuits, vol. 41, No. 12, Dec. 2006, pp. 2885-2900 Dec. 2006.

* cited by examiner

*Primary Examiner* — Fitwi Y Hailegiorgis
(74) *Attorney, Agent, or Firm* — Haynes and Boone, LLP (57) ABSTRACT

A speculative decision feedback equalizer with split unroll multiplexers is provided. The speculative decision feedback equalizer splits an unroll multiplexer into two multiplexers. One split multiplexer provides a data path for the unroll selection signal, and the other split multiplexer provides a separate data path for the summer differential tap. In this way, the loading of an input stage of the summer circuit and the loading from the h1 unrolling loop are decoupled, allowing each split multiplexer to be configured according to a specific timing requirement along a respective data path. Thus, timing performance of the speculative decision feedback equalizer is improved.

20 Claims, 7 Drawing Sheets

SYSTEM AND METHOD FOR DECISION FEEDBACK EQUALIZERS

TECHNICAL FIELD

Examples of the present disclosure generally relate to integrated circuits ("ICs") and, in particular, to an embodiment related to ICs including decision feedback equalizers.

BACKGROUND

As data rates increase to meet demands for higher data throughput, signals transmitted through a communication channel are increasingly susceptible to corruption by frequency-dependent signal loss of the communication channel, such as inter-symbol interference (ISI), and other noise, such as crosstalk, echo, signal dispersion, and distortion. Thus, at the receiver, a decision feedback equalizer (DFE) may be used to remove ISI and other noise by using a feedback loop based on previously decided symbols from the received signal. Typically, in a DFE, when symbols arrive in a unit interval (UI), e.g., a single symbol period, at a time, for each symbol, functions including storing and aligning the previously detected symbol with the UI clock and selecting using the multiplexer need to be completed within the UI, which is challenging as the symbol rate increases. For example, for high data rate operations, e.g., at 32 Gb/s, the UI becomes so small that it is difficult for DFEs to satisfy the timing requirement.

Accordingly, it would be desirable and useful to provide an improved design of DFEs.

SUMMARY

Other aspects and features will be evident from reading the following detailed description and accompanying drawings.

In view of the timing requirement issues in existing DFEs under high data rates, embodiments described herein provide a DFE with improved timing performance. Specifically, the DFE includes a first DFE circuit of a first summer circuit configured to generate a first summer output signal based on a first feedback value of a first feedback loop and a first input symbol of an input signal. The first DFE circuit further includes a first speculative circuit configured to output a first value based on the first summer output signal and a first threshold, and a second speculative circuit configured to output a second value based on the first summer output signal and a second threshold. The first DFE circuit further includes a first multiplexer configured to generate a first multiplexer output signal from one of the first value and the second value, wherein the first multiplexer output signal is provided for equalization of a second input symbol subsequent to the first input symbol from the input signal, and a second multiplexer configured to generate the second multiplexer output signal from one of the first value and the second value, and send the second multiplexer output signal to the feedback loop.

In some embodiments, the DFE further includes a second DFE circuit in parallel to the first DFE circuit. The second DFE circuit includes a second summer circuit configured to generate a second summer output signal based on a second feedback value from a second feedback loop and the second input symbol. The second DFE circuit further includes a third speculative circuit configured to output a third value based on the second summer output signal and the first threshold, and a fourth speculative circuit configured to output a fourth value based on the second summer output signal and the second threshold. The second DFE circuit further includes a third multiplexer configured to generate a third multiplexer output signal from one of the third value and the fourth value. The first multiplexer output signal is generated based on the third multiplexer output signal. The second DFE circuit further includes a fourth multiplexer configured to generate the fourth multiplexer output signal from one of the third value and the fourth value and send the fourth multiplexer output signal to the second feedback loop.

In some embodiments, the first DFE circuit includes a first latch connected to the first multiplexer. The first latch is configured to generate a first selection signal from the first multiplexer output signal and send the first selection signal to the third multiplexer and the fourth multiplexer.

In some embodiments, the second DFE circuit includes a second latch connected to the third multiplexer, wherein the third latch is configured to generate a second selection signal from the third multiplexer output signal and send the second selection signal to the first multiplexer and the second multiplexer.

In some embodiments, the first multiplexer yields a selection-to-output delay satisfying a first timing condition that a sum of a latch delay associated with the first latch and the selection-to-output delay is less than a unit interval.

In some embodiments, the first multiplexer and the second multiplexer are configured with a parallel N-type metal-oxide-semiconductor logic multiplexer structure that provides a gate loading imposed on the first latch, wherein the gate loading yields a latch delay satisfying a predetermined latch delay requirement associated with the first latch.

In some embodiments, the second multiplexer is configured with a size that provides an output drive capacity to drive a loading of an input stage of the first summer circuit.

In some embodiments, the second multiplexer yields a data output delay satisfying a second timing condition that a sum of a speculative circuit delay associated with the first speculative circuit or the second speculative circuit, a settling delay associated with the first summer circuit, and the data output delay is less than two unit intervals.

In some embodiments, the DFE further includes a third feedback loop coupled between the first latch and the second summer circuit, wherein the second summer circuit is configured to further subtract a third feedback value from the third feedback loop from the second input symbol.

In some embodiments, the DFE further includes a fourth feedback loop coupled between the second latch and the first summer circuit, wherein the first summer circuit is configured to further subtract a fourth feedback value from the fourth feedback loop from the first input symbol.

Embodiments described herein further provide a method for equalizing an input signal with decision feedback. The method includes receiving a first input symbol from the input signal, subtracting, at a first summer circuit, a first feedback value from a first feedback loop from the first input symbol. The method further includes outputting, via a first speculative circuit, a first value based on a comparison of a first output of the first summer circuit and a first threshold, and outputting, via a second speculative circuit, a second value based on a comparison of the first output of the first summer circuit and a second threshold. The method further includes generating, via a first multiplexer, a first multiplexer output signal from one of the first value and the second value for h1 multiplexer unrolling, and generating, via a second multiplexer, a second multiplexer output signal from one of the first value and the second value and send the second multiplexer output signal to the first feedback loop.

In some embodiments, the method further includes generating, at a second summer circuit within a second decision feedback equalizer circuit in parallel to the first decision feedback equalizer circuit, a second summer output signal based on a second feedback value from a second feedback loop and the second input symbol. The method further includes outputting, at a third speculative circuit, a third value based on the second summer output signal and the first threshold, and outputting, at a fourth speculative circuit, a fourth value based on the second summer output signal and the second threshold. The method then includes generating, at a third multiplexer, a third multiplexer output signal from one of the third value and the fourth value and sending the third multiplexer output signal to the first multiplexer as a selection signal. The method further includes generating, at a fourth multiplexer, the fourth multiplexer output signal from one of the third value and the fourth value, and sending the fourth multiplexer output signal to the second feedback loop.

In some embodiments, the method further includes generating, at a first latch connected to the first multiplexer, a first selection signal from the first multiplexer output signal and sending the first selection signal to the third multiplexer and the fourth multiplexer.

In some embodiments, the method further includes generating, at a second latch connected to the third multiplexer, a second selection signal from the third multiplexer output signal, and sending the second selection signal to the first multiplexer and the second multiplexer.

In some embodiments, the method further includes subtracting, at the second summer circuit, a third feedback value from a third feedback loop coupled between the first latch and the second summer circuit, from the third feedback loop from the second input symbol.

In some embodiments, the method further includes subtracting, at the first summer circuit, a fourth feedback value from the fourth feedback loop coupled between the second latch and the first summer circuit, from the fourth feedback loop from the first input symbol.

DETAILED DESCRIPTION

Various embodiments are described hereinafter with reference to the figures, in which exemplary embodiments are shown. The claimed invention may, however, be embodied in different forms and should not be construed as being limited to the embodiments set forth herein. Like reference numerals refer to like elements throughout. Like elements will, thus, not be described in detail with respect to the description of each figure. It should also be noted that the figures are only intended to facilitate the description of the embodiments. They are not intended as an exhaustive description of the claimed invention or as a limitation on the scope of the claimed invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described. The features, functions, and advantages may be achieved independently in various embodiments or may be combined in yet other embodiments.

Before describing exemplary embodiments illustratively depicted in the several figures, a general introduction of speculative DFEs is provided to further understanding. In a DFE, the forward path of the DFE, referred to as the h1 tap, generates a symbol decision that is fed back via one or more feedback loops, referred to as the h2 tap, h3 tap, and so on, to a summer circuit. The summer circuit may combine the input signal with the one or more feedback signals (e.g., representing the h2 tap, h3 tap, etc.) to generate an output signal. An unrolled DFE may eliminate or "unroll" the feedback loop partially or fully by pre-computing all possible ISI approximations base on received symbol history, with the correct result selected by a multiplexer based on a previously detected bit. In a speculative DFE, a multiplexer is typically used to "unroll" the h1 tap as well as closing the feedback loop of the h2 tap—namely, the multiplexer provides an output signal that is both fed to the h1 latch to generate an h1 output in the forward data path, and is also fed to the feedback loop of the h2 tap. Thus, to utilize feedback information from previously decided symbols for a current processing UI, the total device delay caused by various components along the h1 tap or the h2 tap must satisfy a particular timing requirement, e.g., total h1 tap delay<1UI, or total h2 tap delay<2UIs, respectively. Such timing requirements may be challenging when the data rate is high, e.g., at 32 Gb/s when a single UI is only 31 ps, while the settling time of the summer circuit in the DFE alone is about 24 ps and the latch delay may be as high as 20 ps under certain environmental conditions.

In view of the timing challenges in DFEs, embodiments described herein provide a speculative DFE structure with split unroll multiplexers. As described below in FIGS. 3-7 in additional detail, the speculative DFE adopts a set of two parallel multiplexers for h1 unrolling and closing the h2 tap, respectively. In this way, the loading of an input stage of the summer circuit and the loading from the h1 unrolling loop are decoupled, allowing each multiplexer to be configured with characteristics to minimize a specific type of delay according to a specific timing requirement along a respective data path, e.g., h1 or h2. Thus, timing performance of the speculative DFE is improved.

With the above general understanding borne in mind, various embodiments for providing the DFEs are described below.

Because one or more of the above-described embodiments and embodiments described throughout the application are exemplified using a particular type of IC, a detailed description of such an IC is provided below. However, it should be understood that other types of ICs may benefit from one or more of the embodiments described herein.

Programmable logic devices ("PLDs") are a well-known type of integrated circuit that can be programmed to perform specified logic functions. One type of PLD, the field programmable gate array ("FPGA"), typically includes an array of programmable tiles. These programmable tiles can include, for example, input/output blocks ("IOBs"), configurable logic blocks ("CLBs"), dedicated random access memory blocks ("BRAMs"), multipliers, digital signal processing blocks ("DSPs"), processors, clock managers, delay lock loops ("DLLs"), and so forth. As used herein, "include" and "including" mean including without limitation.

Each programmable tile typically includes both programmable interconnect and programmable logic. The programmable interconnect typically includes a large number of interconnect lines of varying lengths interconnected by programmable interconnect points ("PIPs"). The programmable logic implements the logic of a user design using programmable elements that can include, for example, function generators, registers, arithmetic logic, and so forth.

The programmable interconnect and programmable logic are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Another type of PLD is the Complex Programmable Logic Device (CPLD). A CPLD includes two or more "function blocks" connected together and to input/output ("I/O") resources by an interconnect switch matrix. Each function block of the CPLD includes a two-level AND/OR structure similar to those used in Programmable Logic Arrays ("PLAs") and Programmable Array Logic ("PAL") devices. In CPLDs, configuration data is typically stored on-chip in non-volatile memory. In some CPLDs, configuration data is stored on-chip in non-volatile memory, then downloaded to volatile memory as part of an initial configuration (programming) sequence.

In general, each of these programmable logic devices ("PLDs"), the functionality of the device is controlled by configuration data provided to the device for that purpose. The configuration data can be stored in volatile memory (e.g., static memory cells, as common in FPGAs and some CPLDs), in non-volatile memory (e.g., FLASH memory, as in some CPLDs), or in any other type of memory cell.

Other PLDs are programmed by applying a processing layer, such as a metal layer, that programmably interconnects the various elements on the device. These PLDs are known as mask programmable devices. PLDs can also be implemented in other ways, e.g., using fuse or antifuse technology. The terms "PLD" and "programmable logic device" include but are not limited to these exemplary devices, as well as encompassing devices that are only partially programmable. For example, one type of PLD includes a combination of hard-coded transistor logic and a programmable switch fabric that programmably interconnects the hard-coded transistor logic.

Figure 1:
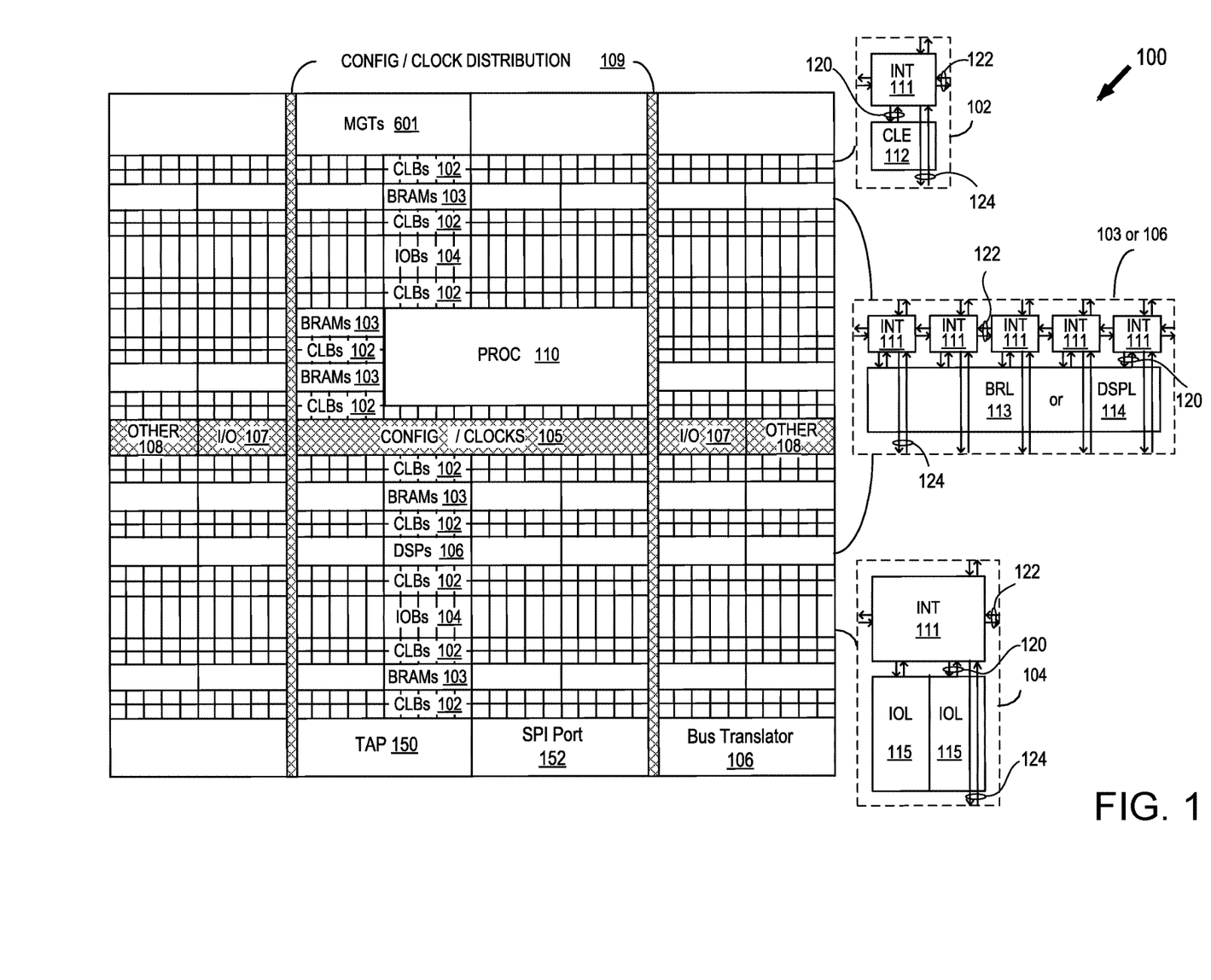
FIG. 1 is a block diagram illustrating an exemplary architecture for an IC on which a receiver containing a DFE may be implemented, according to some embodiments of the present disclosure.

As noted above, advanced FPGAs can include several different types of programmable logic blocks in the array. For example, FIG. 1 illustrates an exemplary FPGA architecture 100. The FPGA architecture 100 includes a large number of different programmable tiles, including multi-gigabit transceivers ("MGTs") 101, configurable logic blocks ("CLBs") 102, random access memory blocks ("BRAMs") 103, input/output blocks ("IOBs") 104, configuration and clocking logic ("CONFIG/CLOCKS") 105, digital signal processing blocks ("DSPs") 106, specialized input/output blocks ("I/O") 107 (e.g., configuration ports and clock ports), and other programmable logic 108 such as digital clock managers, analog-to-digital converters, system monitoring logic, and so forth. Some FPGAs also include dedicated processor blocks ("PROC") 110.

In some FPGAs, each programmable tile can include at least one programmable interconnect element ("INT") 111 having connections to input and output terminals 120 of a programmable logic element within the same tile, as shown by examples included at the top of FIG. 1. Each programmable interconnect element 111 can also include connections to interconnect segments 122 of adjacent programmable interconnect element(s) in the same tile or other tile(s). Each programmable interconnect element 111 can also include connections to interconnect segments 124 of general routing resources between logic blocks (not shown). The general routing resources can include routing channels between logic blocks (not shown) comprising tracks of interconnect segments (e.g., interconnect segments 124) and switch blocks (not shown) for connecting interconnect segments. The interconnect segments of the general routing resources (e.g., interconnect segments 124) can span one or more logic blocks. The programmable interconnect elements 111 taken together with the general routing resources implement a programmable interconnect structure ("programmable interconnect") for the illustrated FPGA.

In an example implementation, a CLB 102 can include a configurable logic element ("CLE") 112 that can be programmed to implement user logic plus a single programmable interconnect element ("INT") 111. A BRAM 103 can include a BRAM logic element ("BRL") 113 in addition to one or more programmable interconnect elements. Typically, the number of interconnect elements included in a tile depends on the height of the tile. In the pictured example, a BRAM tile has the same height as five CLBs, but other numbers (e.g., four) can also be used. A DSP tile 106 can include a DSP logic element ("DSPL") 114 in addition to an appropriate number of programmable interconnect elements. An 10B 104 can include, for example, two instances of an input/output logic element ("IOL") 115 in addition to one instance of the programmable interconnect element 111. As will be clear to those of skill in the art, the actual I/O pads connected, for example, to the I/O logic element 115 typically are not confined to the area of the input/output logic element 115.

In the example of FIG. 1, an area (depicted horizontally) near the center of the die (e.g., formed of regions 105, 107, and 108 shown in FIG. 1) can be used for configuration, clock, and other control logic. Column 109 (depicted vertically) extending from this horizontal area or other columns may be used to distribute the clocks and configuration signals across the breadth of the FPGA.

Some FPGAs utilizing the architecture illustrated in FIG. 1 include additional logic blocks that disrupt the regular columnar structure making up a large part of the FPGA. The additional logic blocks can be programmable blocks and/or dedicated logic. For example, PROC 110 spans several columns of CLBs and BRAMs. PROC 110 can include various components ranging from a single microprocessor to a complete programmable processing system of microprocessor(s), memory controllers, peripherals, and the like.

In one aspect, PROC 110 is implemented as a dedicated circuitry, e.g., as a hard-wired processor, that is fabricated as part of the die that implements the programmable circuitry of the IC. PROC 110 can represent any of a variety of different processor types and/or systems ranging in complexity from an individual processor, e.g., a single core capable of executing program code, to an entire processor system having one or more cores, modules, co-processors, interfaces, or the like.

In another aspect, PROC 110 is omitted from architecture 100, and may be replaced with one or more of the other varieties of the programmable blocks described. Further, such blocks can be utilized to form a "soft processor" in that the various blocks of programmable circuitry can be used to form a processor that can execute program code, as is the case with PROC 110.

The phrase "programmable circuitry" can refer to programmable circuit elements within an IC, e.g., the various programmable or configurable circuit blocks or tiles described herein, as well as the interconnect circuitry that selectively couples the various circuit blocks, tiles, and/or elements according to configuration data that is loaded into the IC. For example, portions shown in FIG. 1 that are external to PROC 110 such as CLBs 102 and BRAMs 103 can be considered programmable circuitry of the IC.

In some embodiments, the functionality and connectivity of programmable circuitry are not established until configuration data is loaded into the IC. A set of configuration data can be used to program programmable circuitry of an IC such as an FPGA. The configuration data is, in some cases, referred to as a "configuration bitstream." In general, programmable circuitry is not operational or functional without first loading a configuration bitstream into the IC. The configuration bitstream effectively implements or instantiates a particular circuit design within the programmable circuitry. The circuit design specifies, for example, functional aspects of the programmable circuit blocks and physical connectivity among the various programmable circuit blocks.

In some embodiments, circuitry that is "hardwired" or "hardened," i.e., not programmable, is manufactured as part of the IC. Unlike programmable circuitry, hardwired circuitry or circuit blocks are not implemented after the manufacture of the IC through the loading of a configuration bitstream. Hardwired circuitry is generally considered to have dedicated circuit blocks and interconnects, for example, that are functional without first loading a configuration bitstream into the IC, e.g., PROC 110.

In some instances, hardwired circuitry can have one or more operational modes that can be set or selected according to register settings or values stored in one or more memory elements within the IC. The operational modes can be set, for example, through the loading of a configuration bitstream into the IC. Despite this ability, hardwired circuitry is not considered programmable circuitry as the hardwired circuitry is operable and has a particular function when manufactured as part of the IC.

FIG. 1 is intended to illustrate an exemplary architecture that can be used to implement an IC that includes programmable circuitry, e.g., a programmable fabric. For example, the numbers of logic blocks in a row, the relative width of the rows, the number and order of rows, the types of logic blocks included in the rows, the relative sizes of the logic blocks, and the interconnect/logic implementations included at the top of FIG. 1 are purely exemplary. For example, in an actual IC, more than one adjacent row of CLBs is typically included wherever the CLBs appear, to facilitate the efficient implementation of user logic, but the number of adjacent CLB rows varies with the overall size of the IC. Moreover, the FPGA of FIG. 1 illustrates one example of a programmable IC that can employ examples of the interconnect circuits described herein. The interconnect circuits described herein can be used in other types of programmable ICs, such as CPLDs or any type of programmable IC having a programmable interconnect structure for selectively coupling logic elements.

It is noted that the IC that may implement the one or more embodiments described herein is not limited to the exemplary IC depicted in FIG. 1, and that IC having other configurations, or other types of IC, may also implement those embodiments.

Figure 2:
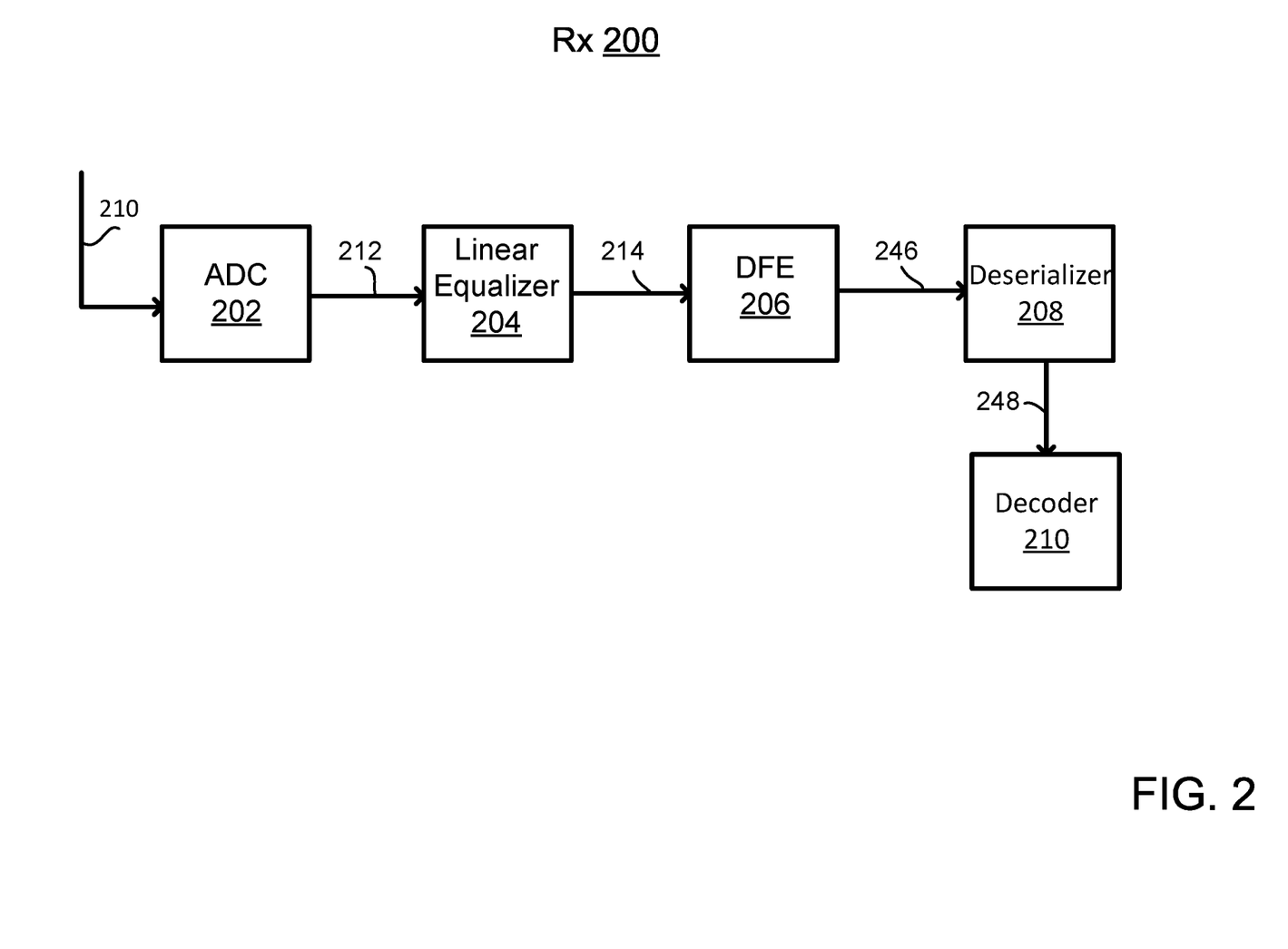
FIG. 2 is a block diagram illustrating an exemplary structure of a receiver containing a DFE which may be implemented on the IC architecture shown in FIG. 1, according to some embodiments of the present disclosure.

FIG. 2 is a block diagram illustrating an exemplary structure of a receiver 200 containing a DFE 206 which may be implemented on the IC architecture 100 shown in FIG. 1, according to some embodiments of the present disclosure. The receiver 200 includes an analog to digital converter (ADC) 202, a linear equalizer 204, a DFE 206, a deserializer 208 and a decoder 210.

It is noted that various signal modulation and demodulation techniques might be employed by the receiver 200. The various signals described herein might employ single-bit or multi-bit data symbols based on various data encoding schemes, such as pulse amplitude modulation (e.g., PAM-4). Further, signal amplitudes might be expressed herein as −1 to 1 such as for Non-Return to Zero (NRZ) signaling, although any signal-encoding scheme might be employed.

In some embodiments, the ADC 202 may receive an analog signal 210, and provides digital conversion of the input analog signal 210. The ADC 202 may sample and digitize the input analog signal 210 based on timing and control of clock and data recovery (CDR) circuitry that is based on a received clock signal based on the timing of the data symbols of the received input analog signal 210. The output 212 of the ADC 202 may include a digital signal of data samples from the input signal 210.

In some embodiments, the linear equalizer 204 receives the digital signal 212 at its input and performs linear equalization to the data symbols from the digital signal 212. The linear equalizer 204 may provide an output 214 to an input of the DFE 206, which in turn generates an output signal 246 after canceling ISI between data symbols of the input signal 214. Further details of the DFE 206 are described in FIGS. 3-7. In some embodiments, the deserializer 208 may then deserialize data bits in the DFE output signal 246 to output a codeword 248 in the form of parallel data bits, for the decoder 210 to decode the codeword 248.

It is noted that FIG. 2 provides an illustrative example of a receiver system 200 where the DFE 206 described herein may be operated at. In some embodiments, DFE 206 may be operated without an ADC 202 converting an analog input signal. In this embodiment, DFE 206 may be an analog equalizer that are configured to handle analog input voltage signals. Embodiments of the structure of DFE 206 and the process of operating DFE 206 described in FIGS. 3-7 may be applied to both a digital DFE and an analog DFE.

Figure 3:
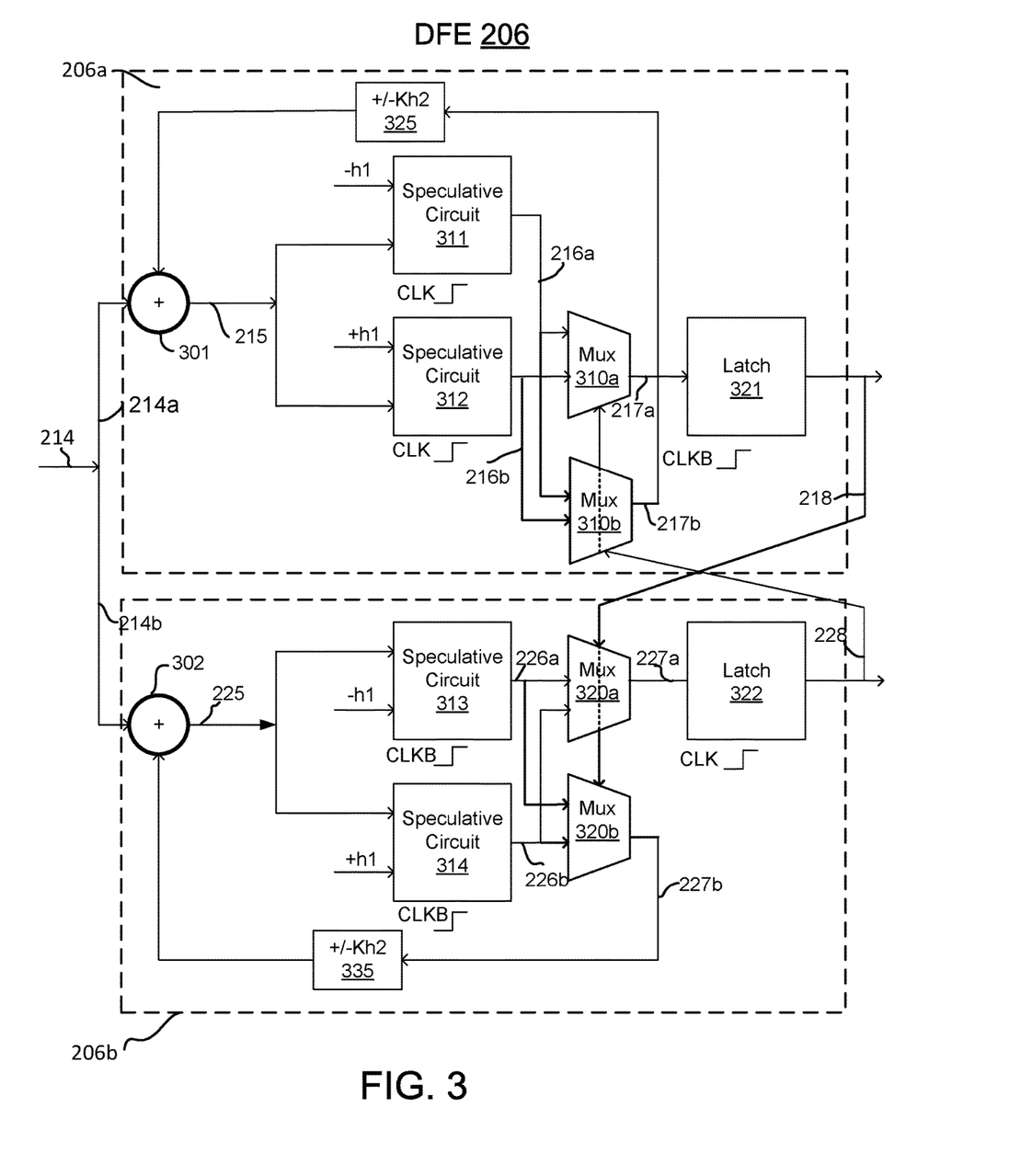
FIG. 3 is a block diagram illustrating an exemplary structure of a two-tap DFE with split multiplexers, according to some embodiments of the present disclosure.

FIG. 3 is a block diagram illustrating an exemplary structure of a two-tap DFE 206 with split multiplexers, according to some embodiments of the present disclosure. The DFE 206 may include two parallel DFE blocks 206a and 206b, each of which is configured to receive and process every other data symbol from the input signal 214. For example, when a first data symbol 214a in the first UI is sent to DFE block 206a, the second data symbol 214b in the next UI that is immediately subsequent to the first data symbol 214a is sent to DFE block 206b, and so on. In some embodiments, DFE 206 is implemented with a half-rate design and is also referred to as a half-rate DFE. The half-rate DFE includes an odd DFE block 206a (e.g., handling the $1^{st}$, $3^{rd}$, $5^{th}$, $7^{th}$ . . . data symbols, referred to as the odd data symbols 214a from the input signal) and an even DFE block 206b (e.g., handling the $2^{nd}$, $4^{th}$, $6^{th}$, $8^{th}$, . . . data symbols, referred to as the even data symbols 214b from the input signal). Each of the old and even DFE blocks 206a and 206b may use a half-rate clock (e.g., a 2T clock).

The DFE blocks 206a-b may have similar components. For example, DFE block 206a includes a summer circuit 301 configured to receive the odd input data symbol 214a and generate a summer output signal 215. The summer circuit 301 may combine the input signal 214a with the one or more feedback signals from feedback taps (e.g., representing the h2 tap, h3 tap, etc.) to generate a summer output signal 215. For example, the summer circuit 301 may include a circuit of resistors and/or amplifiers that adds the input voltage signals together. The feedback value from the feedback tap 325 may represent a (weighted) value (e.g., h2 tap, h3 tap) corresponding to a previously decided symbol (e.g., a symbol estimated one UI prior to the current UI, two UIs prior to the current UIs, etc.), which is to be combined with the current symbol 214a at the summer circuit 301 to cancel out ISI.

Similarly, DFE block 206b includes a summer circuit 302 configured to receive the even input data symbol 214b and generate a summer output signal 225. The summer circuit 302 may combine the input signal 214b with the one or more feedback signals from feedback taps 335 (e.g., representing the h2 tap, h3 tap, etc.) to generate a summer output signal 225. For example, the summer circuit 302 may include a circuit of resistors and/or amplifiers that adds the input voltage signals together. The feedback value from the feedback tap 325 may represent a (weighted) value (e.g., h2 tap, h3 tap) corresponding to a previously decided symbol (e.g., a symbol estimated one UI prior to the current UI, two UIs prior to the current UIs, etc.), which is to be combined with the current symbol 214b at the summer circuit 302 to cancel out ISI.

The DFE block 206a further feeds the output signal 215 from the summer circuit 301 to a first speculative circuit 311 configured to output a first speculative value 216a and a second speculative circuit 312 configured to output a second speculative value 216b.

In some embodiments, when DFE 206 is a digital DFE, e.g., when the received signal 210 is digitalized at the ADC 202 before being processed at linear equalizer 204 and DFE 206 in FIG. 2, the speculative circuit 311 may be a data slicer having a threshold of −h1, and the speculative circuit 312 may be a data slicer having a threshold of +h1. Specifically, the data slicer at speculative circuit 311 includes a comparator that is configured to compare the summer output signal 215 with the threshold −h1 by computing the difference between the summer output signal 215 and the threshold −h1, e.g., summer output 215−(−h1)=summer output 215+h1, and outputting the sign of the difference. Thus, the first speculative value 216a represents a "high" value, e.g., +1 when the summer output signal 215 is greater than the threshold −h1, or represents a "low" value, e.g., 0, when the summer output signal 215 is less than the threshold −h1. Similarly, the data slicer at speculative circuit 312 includes a comparator that is configured to compare the summer output signal 215 with the threshold +h1 by computing the difference between the summer output signal 215 and the threshold +h1, e.g., summer output 215−h1, and outputting the sign of the difference. Thus, the second speculative value 216b represents a "high" value, e.g., +1 when the summer output signal 215 is greater than the threshold +h1, or represents a "low" value, e.g., 0, when the summer output signal 215 is less than the threshold +h1.

In some embodiments, the DFE 206 is an analog DFE, e.g., when an analog signal is fed to the DFE 206 without the ADC 202 in FIG. 2. Each of the speculative circuits 311 and 312 may include an adder (e.g., a summer circuit). The adders of speculative circuits 311 and 312 (adds the value −h1 or +h1 to the summer output signal 215, respectively. Thus the speculative circuit 311 generates the first speculative value 216a corresponding to the summer output signal 215 minus h1, and the speculative circuit 312 generates the second speculative value 216b corresponding to the summer output signal 215 plus h1. In some implementations, analog output signals from the adders in the speculative circuits 311 and 312 may be optionally quantized by a level slicer, which convert the analog output of the adders to a one-or-more-bit (e.g., 1-bit, 2-bit) code representing a possible data decision.

Similarly, DFE block 206b further includes a third speculative circuit 313 configured to output a third speculative value 226a and a fourth speculative circuit 314 configured to output a fourth speculative value 226b. The third speculative circuit 313 and the fourth speculative circuit 314 may generate a speculative value 227a or 227b, in a similar way as described in relation to the first and the second speculative circuits 311-312.

In some embodiments within each DFE block 206a or 206b, a single multiplexer is used to both unroll the h1 tap and to close the feedback loop of the h2 tap. In those embodiments, DFE block 206a uses one single multiplexer in place of the multiplexers 310a-b shown in FIG. 3. The output of the single multiplexer is passed through the latch 321 to provide a selection signal 218 to the single multiplexer (in place of the multiplexers 320a-b) in the DFE block 206b, and also to be fed to the feedback loop of the h2 tap 325. In those embodiments, the timing requirement for the DFE with a single multiplexer for both h1 unrolling and h2 tap closing includes: (i) for h1 tap: Tcq_latch+Tsel_out<1UI, where Tcq_latch is the clock-to-output delay of latch 321, and Tsel_out is the selection-to-output delay of the single multiplexer (in place of the multiplexers 320a-b); and (ii) for h2 tap: Tcq_slicer+Tdata_out+Tsum_settle<2UI, where Tcq_slicer is the clock-to-output delay of data slicer 311 or 312 (e.g., when the speculative circuits 311 and 312 are digital), Tdata_out is the data-to-output delay of the single multiplexer (in place of the multiplexers 310a-b) and Tsum_settle is the time delay from the time that the feedback value through the h2 tap 325 toggles till the time when the output voltage of the summer circuit 301 settles to within 90% of the final voltage.

When the data rate increases, e.g., at 32 Gb/s, the UI is only 31 ps, which makes the above timing requirements difficult to meet. For example, in some scenarios, due to temperature and other environmental factors, Tcq_latch may be as high as 20 ps, and Tsel_out can be around 10 ps, thereby leaving very little margin for the h1 timing requirement. In the same example of 32 Gsb/s data rate, when Tcq_slicer may be around 30 ps, and Tsum_settle may be around 25 ps (or even higher as each summer circuit 301 or 302 needs to load two data slicers), Tdata_out can be at most 6 ps to meet the h2 timing requirement. Thus, for a single multiplexer to provide Tdata_out no greater than 6 ps, the single multiplexer (in place of 310a-b or 320a-b) shall be large enough based on the relationship between the propagation delay and fan-out of the single multiplexer, e.g., with a fan-out of 3 which doubles the size of multiplexers used in existing DFEs. The doubled size of the single multiplexer would in turn double Tsel_out, e.g., as high as 20 ps, which violates the h1 timing requirement at 32 Gb/s.

To resolve the dilemma of satisfying both timing requirements under h1 unrolling and h2 feedback loop, DFE block 206a shown in FIG. 3 employs two multiplexers 310a-b, and DFE block 206b employs two multiplexers 320a-b in place of a single unroll multiplexer that was conventionally used in an even or odd DFE block. Specifically, at DFE circuit 206a, a multiplexer 310a is configured to unroll h1 tap by generating an output signal 217a from one of the speculative values 216a-b according to the selection signal 228. The output signal 217a (e.g., decision for x[2n+1]) from the multiplexer 310a is fed to the latch 321, which in turn outputs the selection signal 218 for the multiplexers 320a-b in DFE circuit 206b (e.g., for h1 tap unrolling for the next symbol x[2n+2] based on the current decision for x[2n+1]). On the other hand, another multiplexer 310b in parallel to the multiplexer 310a is configured to generate an output signal 217b from one of the speculative values 216a-b according to the same selection signal 228 and feed the output signal 217b (e.g., decision for x[2n+1]) through h2 tap 325 back to the summer circuit 301 (e.g., for determining the symbol x[2n+3] based on the current decision for x[2n+1]). As discussed above, in some embodiments, multiplexers 310a-b are parallel multiplexers that receive the same inputs from the speculative circuits 311-312, and are controlled by the same selection signal 228, and therefore are referred to as called split parallel multiplexers 310a-b.

Similarly, at DFE circuit 206b, the multiplexer 320a is configured to unroll h1 tap by generating an output signal 227a (e.g., decision for x[2n+2]) from one of the speculative values 226a-b according to the selection signal 218, which is generated from the unrolling multiplexer 310a in DFE circuit 206a (e.g., based on decision for x[2n+1]). The output signal 227a (e.g., decision for x[2n+2]) from the multiplexer 320a is fed to the latch 322, which in turn outputs the selection signal 228 for the multiplexers 310a-b in DFE circuit 206a (e.g., for h1 tap unrolling for the next symbol x[2n+3]). The other multiplexer 320b in parallel to the multiplexer 320a is configured to generate an output signal 227b from one of the speculative values 226a-b according to the same selection signal 218 and feed the output signal 227b through h2 tap 335 back to the summer circuit 302 (e.g., for determining the symbol x[2n+4] based on x[2n+2]).

The output signals 217a-b of the parallel multiplexers 310a-b in DFE block 206a are thus decided by the selection signal 228 outputted from the latch 321 in DFE block 206b, which represents a detected value of the previous symbol handle by DFE block 206b. For example, when the detected value of the previous (even) symbol at DFE block 206b is "low" (e.g., 0) which renders the selection signal 228 to be "low" (e.g., 0), multiplexers 310a-b select to output the first speculative value 216a. When the estimated value of the previous (even) symbol at DFE block 206b is "high" (e.g., +1) which renders the selection signal 228 to be "high" (e.g., +1), multiplexers 310a-b selects to output the second speculative value 216b.

Similarly, the output signals 227a-b of the parallel multiplexers 320a-b in DFE block 206b are thus decided by the selection signal 218 outputted from the latch 322 in DFE block 206b, which represents an estimated value of the previous symbol handle by DFE block 206a. For example, when the estimated value of the previous (odd) symbol at DFE block 206a is "low" which renders the selection signal 218 to be "low," multiplexers 320a-b select to output the third speculative value 226a. When the estimated value of the previous (odd) symbol at DFE block 206a to be +1 which renders the selection signal 218 to be "high," multiplexers 310a-b select to output the fourth speculative value 226b.

In this way, by employing two split multiplexers 310a-b and 320a-b in each DFE circuit 206a or 206b to provide two data paths, the loading of the input stage of the summer circuit 301 (or 302) and the wire loading from the h1 unrolling loop can be decoupled. Each multiplexer 310a, 310b, 320a or 320b can serve a specific timing requirement even under a high data rate, e.g., 32 Gb/s. Further detail of timing requirement analysis of DFE 206 is discussed in relation to FIG. 4.

Figure 4:
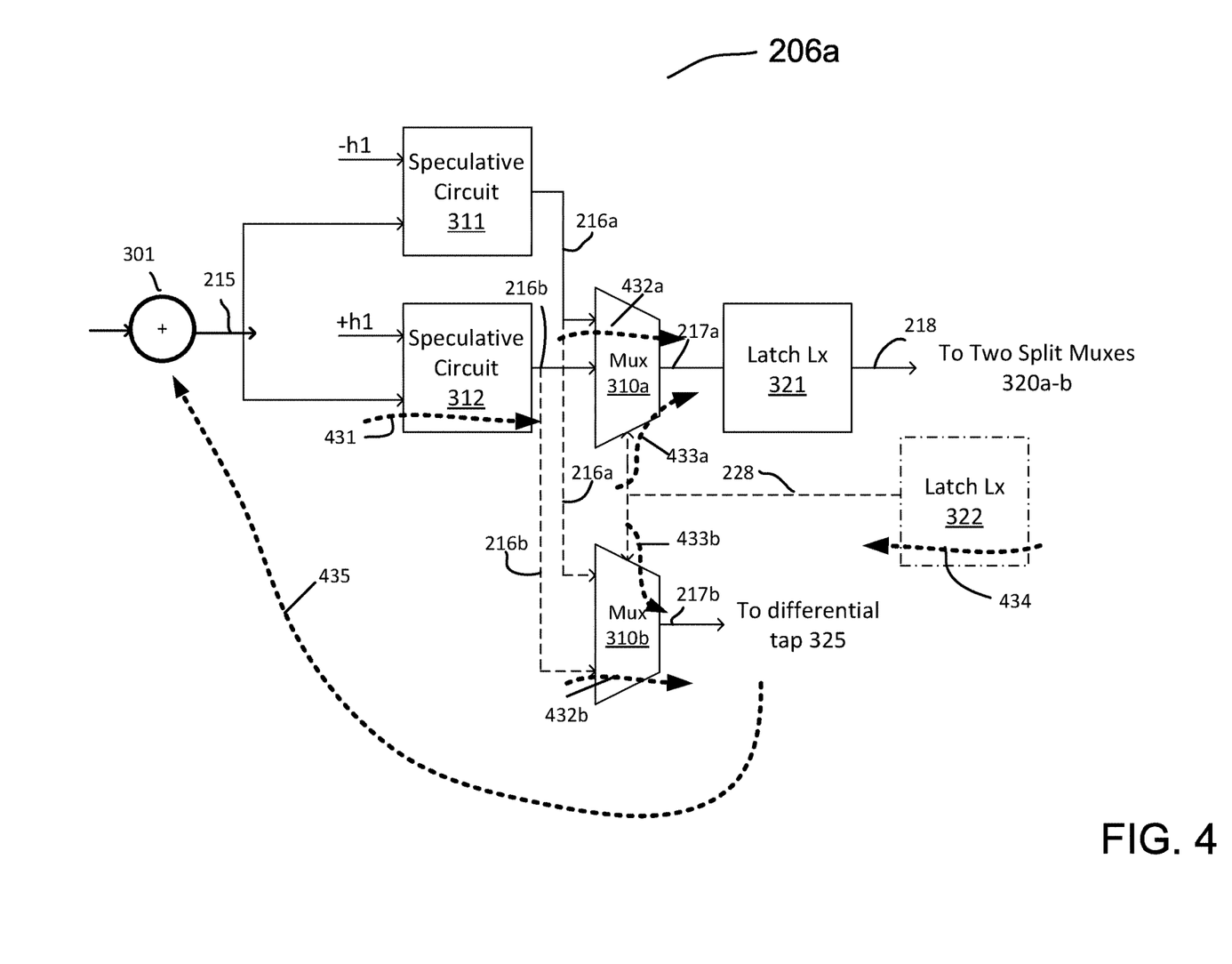
FIG. 4 is a block diagram illustrating an enhanced view of a part of the exemplary structure shown in FIG. 3, according to some embodiments of the present disclosure.

FIG. 4 is a block diagram illustrating a part of the exemplary structure, e.g., DFE circuit 206a shown in FIG. 3, with data paths 432a-b, 433a-b, 434 and 435 showing various device delays, according to some embodiments of the present disclosure. As shown in FIG. 4, the outputs 216a-b of the speculative circuits 311 and 312 drive the parallel multiplexers 310a-b. When the incoming data symbol 215 crosses the threshold +/−h1 at the speculative circuits 311 or 312, the speculative output 216a or 216b may toggle, and thus the differential inputs 216a-b to the parallel multiplexers 310a-b may toggle. The output 217a of multiplexer 310a may toggle after a delay Tdata_outa (shown at data path 432a) and the output 217b of multiplexer 310b may toggle after a delay Tdata_outb (shown at data path 432b). When the output signal 228 from latch 322 toggles, the output signal 217a from the multiplexer 310a toggles after a delay Tsel_outa (shown at data path 433a) and the output signal 217b from the multiplexer 310b toggles after a delay Tsel_outb (shown at data path 433b). Thus, with two split multiplexers 310a-b, the timing requirements for the DFE circuit 206a become: (i) for h1 tap: Tcq_latch+Tsel_outa<1UI, where Tcq_latch is the clock-to-output delay of latch 322, and Tsel_outa is the selection-to-output delay of the multiplexer 310a; and (ii) for h2 tap: Tcq_slicer+Tdata_outb+Tsum_settle<2UI, where Tcq_slicer is the clock-to-output delay of speculative circuit 311 or 312 when the speculative circuit is a data slicer (shows at data path 431), Tdata_outb is the data-to-output delay of the multiplexer 310b and Tsum_settle is the time delay (shown at data path 435) from the time that the feedback value through the h2 tap 325 toggles till the time when the output voltage of the summer circuit 301 settles to within 90% of the final voltage.

By decoupling the loading of the h2 multiplexer 310b from the h1 unroll multiplexer 310a, timing requirements may be easier to meet by selecting multiplexer 310a with a reduced Tsel_outa and multiplexer 310b with a reduced Tdata_outb. Namely, when multiplexer 310b is chosen with a fan-out of 3 and a relatively large size to reduce Tdata_outb, Tsel_outa will not be affected, and thus the h1 timing requirement is not violated.

Figure 5:
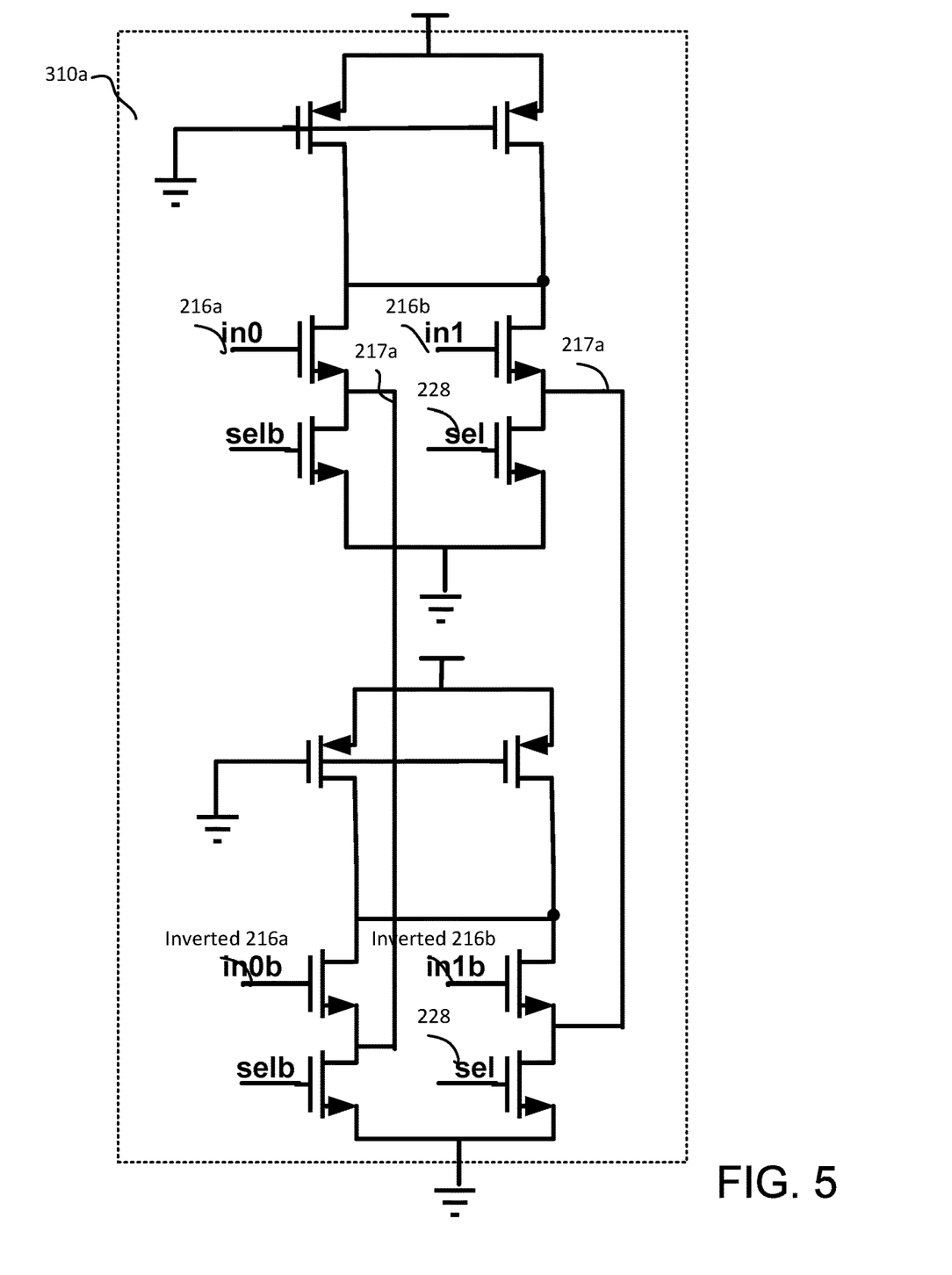
FIG. 5 is a block diagram illustrating an exemplary circuit structure of the split multiplexers used in the DFE shown in FIGS. 3-4, according to some embodiments of the present disclosure.

FIG. 5 is a block diagram illustrating an exemplary circuit structure of a split multiplexer 310a, 310b, 320a or 320b used in the DFE 206 shown in FIGS. 3-4, according to some embodiments of the present disclosure. The multiplexer structure shown in FIG. 5 uses an NMOS input (at 216a-b) with an active PMOS load structure. Specifically, the selection signal 218 or the inverted selection signal 218 is applied to the gates of the transistors so as to generate an output signal 217a from one of the differential inputs 216a-b or the inverted differential inputs 216a-b. The structure of the multiplexer 310a reduces the gate loading that multiplexer 310a imposes on latch 321, which in turn reduce the latch delay Tcq_latch to meet the h1 timing requirement. The multiplexer 310b in FIG. 4, when employing a similar structure as shown in FIG. 5, is provided with a size that provides an output drive capacity to drive a loading of the current-mode logic stage of the summer circuit 301 for the summer 301 to switch fast enough to meet the h2 timing requirement.

Figure 6:
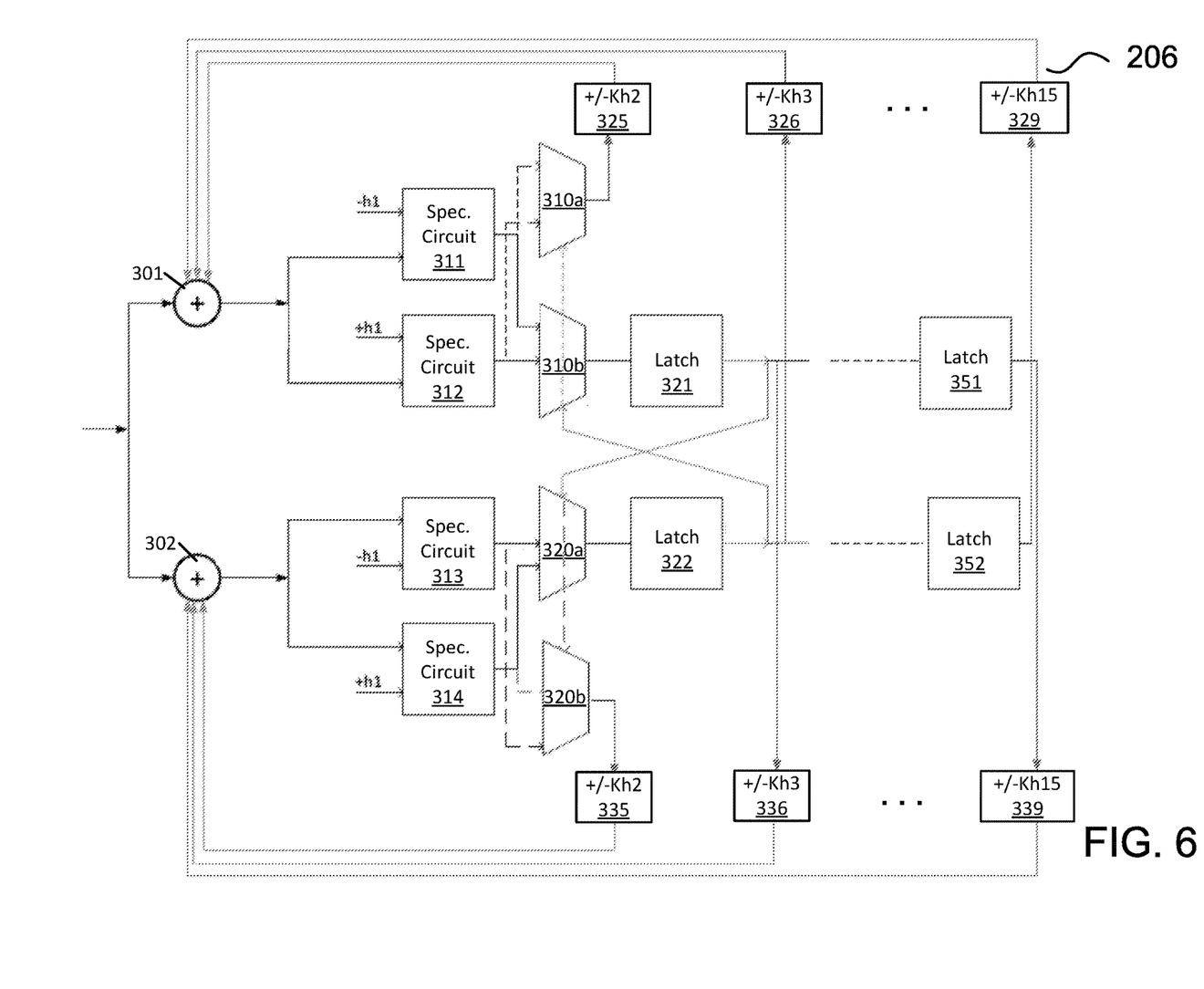
FIG. 6 is a block diagram illustrating an exemplary structure of a multi-tap DFE with split multiplexers, according to some embodiments of the present disclosure

FIG. 6 is a block diagram illustrating an exemplary structure of a multi-tap DFE with split multiplexers, according to some embodiments of the present disclosure. DFE 206 shown in FIG. 6 includes additional feedback taps 326, 336, 329, 339, etc. For each additional tap, a latch such as latch 351 or latch 352 may be used to generate an output signal to the respective feedback loop. For example, the output signal of latch 321 may be sent to the h3 tap 336, which in turn feeds a h3 feedback value to the summer circuit 302 to be subtracted from the input symbol at summer 302. On the other hand, the output signal of latch 322 may be sent to the h3 tap 326, which in turn feeds a h3 feedback value to the summer circuit 301 to be subtracted from the input symbol at summer 301, and so on. The DFE 206 shown in FIG. 6 illustrates 15 taps. The tap weights Khn (n=1, . . . 15) are shared between the even and odd blocks of DFE (e.g., the DFE circuit 206a and 206b).

In some embodiments, each of the outputs of h3 tap (326 or 336) through h15 tap (329 or 339) may be further split into separate multiplexers in a similar way of multiplexers 310a-b to further decouple the forward data path and the feedback data path. This may further improve the summer timing settling time margin of the summer circuits 301-302 at different taps but may not be as power efficient as the structure shown in FIG. 6—the power consumption may be doubled due to the added multiplexers.

Figure 7:
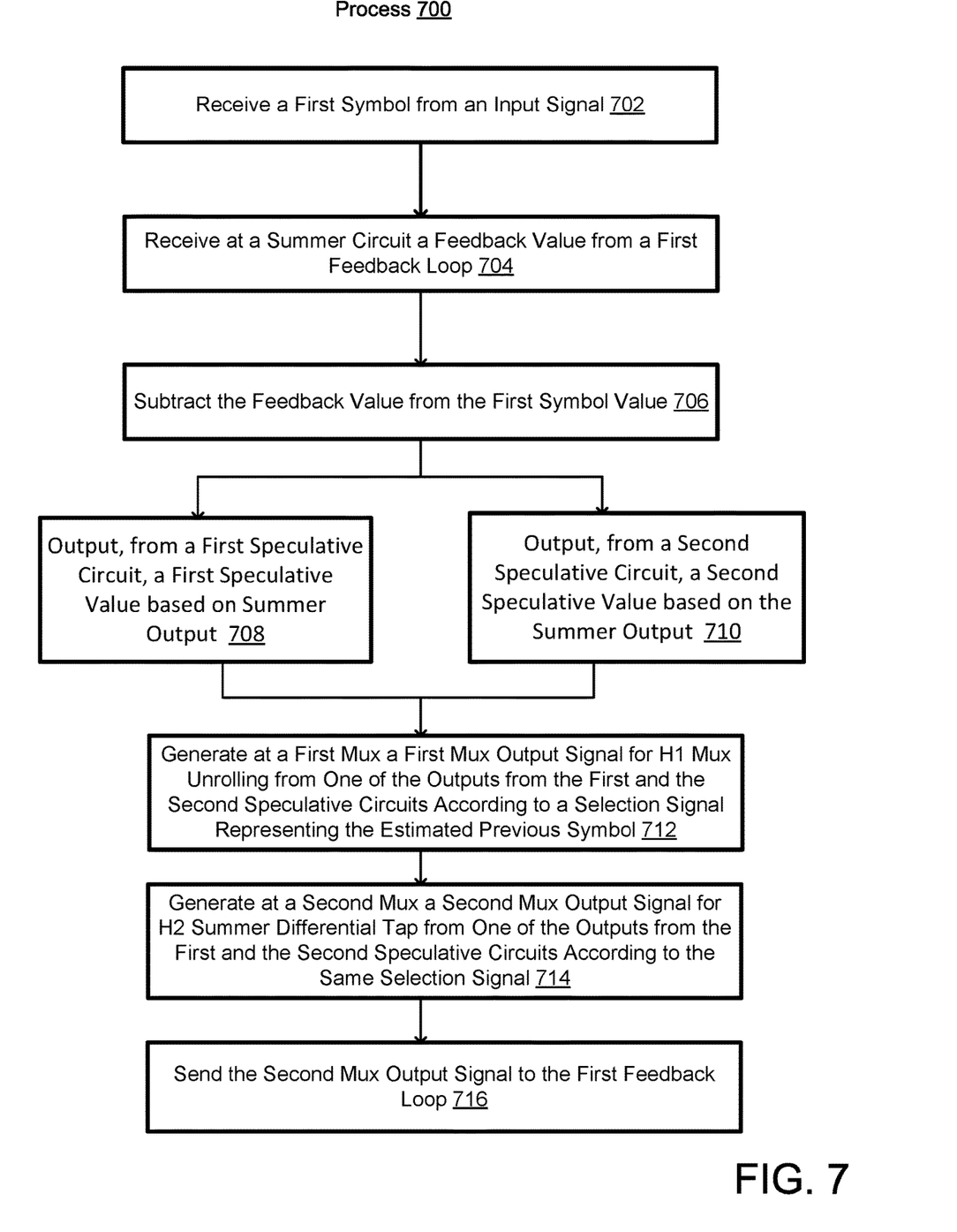
FIG. 7 is a logic flow diagram illustrating a process of operating the DFE with split multiplexers shown in FIG. 3 to cancel ISI from an input signal, according to some embodiments of the present disclosure.

FIG. 7 is a logic flow diagram illustrating a method 700 of operating the DFE 206 with split multiplexers 310a-b or 320a-b shown in FIG. 3 to cancel ISI from an input signal, according to some embodiments of the present disclosure. Process 700 may start at process 702, at which a first symbol (e.g., input symbol 214a in FIG. 3) is received at the DFE (e.g., DFE 206 in FIG. 3) from an input signal (e.g., digital signal 214 in FIG. 3). At process 704, a feedback value from a first feedback loop (e.g., h2 tap 325 in FIG. 3) is received at a summer circuit (e.g., summer 301 in FIG. 3). At process 706, the feedback value is subtracted from the first symbol value to result in an output signal (e.g., signal 215 in FIG. 3).

Method 700 then proceeds to processes 708 and 710, which may be implemented in parallel. At process 708, a first speculative value (e.g., 216b in FIG. 3) may be outputted from a first speculative circuit (e.g., 311 in FIG. 3) based on the summer output (e.g., signal 215 in FIG. 3). For example, as discussed in relation to speculative circuit 311 in FIG. 3, the first speculative value may be generated by a data slicer as a sign of the difference between the summer output and a first slicer threshold, e.g., −h1. Or alternatively, the first speculative value may be a signal representing the summer output minus h1, for an analog DFE. At process 710, a second speculative (e.g., 216b in FIG. 3) may be outputted from a second speculative circuit (e.g., 312 in FIG. 3) based on the summer output (e.g., signal 215 in FIG. 3). For example, as discussed in relation to speculative circuit 312 in FIG. 3, the second speculative value may be generated by a data slicer as a sign of the difference between the summer output and a second slicer threshold, e.g., +h1. Or alternatively, the second speculative value may be a signal representing the summer output plus h1, for an analog DFE.

Process 700 then proceeds from processes 708 and 710 to process 712, at which a first multiplexer output signal (e.g., output signal 217a in FIG. 3) for h1 multiplexer unrolling is generated at the first multiplexer (e.g., multiplexer 310a in FIG. 3) from one of the outputs (e.g., outputs 216a-b in FIG. 3) from the speculative circuits (e.g., 311-312 in FIG. 3). At process 714, a second multiplexer output signal (e.g., output signal 217b in FIG. 3) for h2 summer differential tap is generated at the second multiplexer (e.g., multiplexer 310b in FIG. 3) from one of the outputs (e.g., outputs 216a-b in FIG. 3) from the speculative circuits (e.g., 311-312 in FIG. 3). At both processes 712 and 716, the first multiplexer and the second multiplexer select the respective output according to a selection signal (e.g., 228 in FIG. 3) that represents an estimated symbol value of a previous symbol, as discussed in relation to signal 228 in FIG. 3. At process 716, the second multiplexer output signal (e.g., 217b in FIG. 3) is sent to the first feedback loop (e.g., h2 tap 325 in FIG. 3). In this way, the data paths for h1 unrolling and h2 summer closing are decoupled, e.g., through processes 714-716.

It is noted that various configurations illustrated in FIGS. 1-7 are exemplary only and not intended to be limiting beyond what is specifically recited in the claims that follow. It will be understood by those skilled in that art that other configurations may be used. One or more elements in the various embodiments may be implemented by software, hardware (e.g., an application specific integrated circuit (ASIC), application-specific standard parts (ASSPs), a logic on a programmable logic IC (e.g., FPGA)), firmware, and/or a combination thereof. The embodiments may be implemented using various hardware resources, such as for example DSP slices, BRAM, and programmable resources of an FPGA; however, in other embodiments, digital signal processors, microprocessors, multi-core processors, memory, and/or other hardware may be used. When implemented in software, the elements of the embodiments of the invention are essentially the code segments to perform the necessary tasks. The program or code segments can be stored in a processor-readable storage medium or device that may have been downloaded by way of a computer data signal embodied in a carrier wave over a transmission medium or a communication link. The processor readable storage device may include any medium that can store information including an optical medium, semiconductor medium, and magnetic medium. Processor readable storage device examples include an electronic circuit; a semiconductor device, a semiconductor memory device, a read-only memory (ROM), a flash memory, an erasable programmable read-only memory (EPROM); a floppy diskette, a CD-ROM, an optical disk, a hard disk, or other storage device. The code segments may be downloaded via computer networks such as the Internet, Intranet, etc.

Although particular embodiments have been shown and described, it will be understood that it is not intended to limit the claimed inventions to the preferred embodiments, and it will be obvious to those skilled in the art that various changes and modifications may be made without departing from the spirit and scope of the claimed inventions. The specification and drawings are, accordingly, to be regarded in an illustrative rather than restrictive sense. The claimed inventions are intended to cover alternatives, modifications, and equivalents.

What is claimed is:

1. A circuit, comprising:
a first decision feedback equalizer circuit including:
a first summer circuit configured to generate a first summer output signal based on a first feedback value of a first feedback loop and a first input symbol of an input signal;
a first speculative circuit configured to output a first value based on the first summer output signal and a first threshold;
a second speculative circuit configured to output a second value based on the first summer output signal and a second threshold;
a first multiplexer configured to generate a first multiplexer output signal from one of the first value and the second value, wherein the first multiplexer output signal is provided for equalization of a second input symbol subsequent to the first input symbol from the input signal; and
a second multiplexer configured to generate the second multiplexer output signal from one of the first value and the second value, and send the second multiplexer output signal to the first feedback loop.

2. The circuit of claim 1, further comprising:
a second decision feedback equalizer circuit in parallel to the first decision feedback equalizer circuit, wherein the second decision feedback equalizer circuit includes:
a second summer circuit configured to generate a second summer output signal based on a second feedback value from a second feedback loop and the second input symbol;
a third speculative circuit configured to output a third value based on the second summer output signal and the first threshold;
a fourth speculative circuit configured to output a fourth value based on the second summer output signal and the second threshold;
a third multiplexer configured to generate a third multiplexer output signal from one of the third value and the fourth value;
wherein the first multiplexer output signal is generated based on the third multiplexer output signal; and
a fourth multiplexer configured to generate the fourth multiplexer output signal from one of the third value and the fourth value and send the fourth multiplexer output signal to the second feedback loop.

3. The circuit of claim 2, further comprising:
a first latch connected to the first multiplexer, wherein the first latch is configured to generate a first selection signal from the first multiplexer output signal and send the first selection signal to the third multiplexer and the fourth multiplexer.

4. The circuit of claim 3, wherein the first multiplexer yields a selection-to-output delay satisfying a first timing condition that a sum of a latch delay associated with the first latch and the selection-to-output delay is less than a unit interval.

5. The circuit of claim 3, wherein the first multiplexer and the second multiplexer are configured with a parallel N-type metal-oxide-semiconductor logic multiplexer structure that provides a gate loading imposed on the first latch, wherein the gate loading yields a latch delay satisfying a predetermined latch delay requirement associated with the first latch.

6. The circuit of claim 2, further comprising:
a second latch connected to the third multiplexer, wherein the third latch is configured to generate a second selection signal from the third multiplexer output signal and send the second selection signal to the first multiplexer and the second multiplexer.

7. The circuit of claim 6, further comprising:
a third feedback loop coupled between the first latch and the second summer circuit, wherein the second summer circuit is configured to further subtract a third feedback value from the third feedback loop from the second input symbol.

8. The circuit of claim 6, further comprising:
a fourth feedback loop coupled between the second latch and the first summer circuit, wherein the first summer circuit is configured to further subtract a fourth feedback value from the fourth feedback loop from the first input symbol.

9. The circuit of claim 2, wherein the second multiplexer is configured with a size that provides an output drive capacity to drive a loading of an input stage of the first summer circuit.

10. The circuit of claim 9, wherein the second multiplexer yields a data output delay satisfying a second timing condition that a sum of a speculative circuit delay associated with the first speculative circuit or the second speculative circuit, a settling delay associated with the first summer circuit, and the data output delay is less than two unit intervals.

11. A method for equalizing an input signal with decision feedback, comprising:
receiving a first input symbol from the input signal;
subtracting, at a first summer circuit, a first feedback value from a first feedback loop from the first input symbol;
outputting, via a first speculative circuit, a first value based on a comparison of a first output of the first summer circuit and a first threshold;
outputting, via a second speculative circuit, a second value based on a comparison of the first output of the first summer circuit and a second threshold;
generating, via a first multiplexer, a first multiplexer output signal from one of the first value and the second value for equalization of a second input symbol subsequent to the first input symbol from the input signal; and
generating, via a second multiplexer, a second multiplexer output signal from one of the first value and the second value and send the second multiplexer output signal to the first feedback loop.

12. The method of claim 11, further comprising:
generating, at a second summer circuit within a second decision feedback equalizer circuit in parallel to the first decision feedback equalizer circuit, a second summer output signal based on a second feedback value from a second feedback loop and the second input symbol;
outputting, at a third speculative circuit, a third value based on the second summer output signal and the first threshold;
outputting, at a fourth speculative circuit, a fourth value based on the second summer output signal and the second threshold;
generating, at a third multiplexer, a third multiplexer output signal from one of the third value and the fourth value;
sending the third multiplexer output signal to the first multiplexer as a selection signal;
generating, at a fourth multiplexer, the fourth multiplexer output signal from one of the third value and the fourth value; and sending the fourth multiplexer output signal to the second feedback loop.

13. The method of claim 12, further comprising:

generating, at a first latch connected to the first multiplexer, a first selection signal from the first multiplexer output signal; and sending the first selection signal to the third multiplexer and the fourth multiplexer.

14. The method of claim 13, wherein the first multiplexer yields a selection-to-output delay satisfying a first timing condition that a sum of a latch delay associated with the first latch and the selection-to-output delay is less than a unit interval.

15. The method of claim 13, wherein the first multiplexer and the second multiplexer are configured with a parallel N-type metal-oxide-semiconductor logic multiplexer structure that provides a gate loading imposed on the first latch, wherein the gate loading yields a latch delay satisfying a predetermined latch delay requirement associated with the first latch.

16. The method of claim 12, further comprising:

generating, at a second latch connected to the third multiplexer, a second selection signal from the third multiplexer output signal; and sending the second selection signal to the first multiplexer and the second multiplexer.

17. The method of claim 16, further comprising:

subtracting, at the second summer circuit, a third feedback value from a third feedback loop coupled between the first latch and the second summer circuit, from the third feedback loop from the second input symbol.

18. The method of claim 16, further comprising:

subtracting, at the first summer circuit, a fourth feedback value from the fourth feedback loop coupled between the second latch and the first summer circuit, from the fourth feedback loop from the first input symbol.

19. The method of claim 12, wherein the second multiplexer is configured with a size that provides an output drive capacity to drive a loading of an input stage of the first summer circuit.

20. The method of claim 19, wherein the second multiplexer yields a data output delay satisfying a second timing condition that a sum of a speculative circuit delay associated with the first speculative circuit or the second speculative circuit, a settling delay associated with the first summer circuit, and the data output delay is less than two unit intervals.

\* \* \* \* \*